(12) United States Patent
Shores et al.

(10) Patent No.: US 7,031,273 B2
(45) Date of Patent: Apr. 18, 2006

(54) SESSION INITIATION PROTOCOL RETRANSMISSION METHOD

(75) Inventors: William N. Shores, Phoenix, AZ (US); Nandakishore A. Albal, Scottsdale, AZ (US); Louis C. Depalma, Gilbert, AZ (US); Thomas P. Emmons, Jr., Mesa, AZ (US); Derek A. Oxley, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 210 days.

(21) Appl. No.: 10/830,557

(22) Filed: Apr. 23, 2004

(65) Prior Publication Data

US 2005/0237999 A1    Oct. 27, 2005

(51) Int. Cl.
*H04L 12/66* (2006.01)
*H04B 7/216* (2006.01)
*H04B 7/20* (2006.01)
*H04B 7/15* (2006.01)
*G06F 15/16* (2006.01)

(52) U.S. Cl. .................. 370/320; 370/335; 370/342; 370/352; 455/517; 455/11.1; 709/227

(58) Field of Classification Search ............ None
See application file for complete search history.

(56) References Cited

U.S. PATENT DOCUMENTS

| 2002/0061762 A1* | 5/2002 | Maggenti et al. ........... 455/519 |
| 2003/0133408 A1* | 7/2003 | Cheng et al. ............... 370/230 |
| 2004/0132452 A1* | 7/2004 | Lee ........................... 455/445 |
| 2004/0230659 A1* | 11/2004 | Chase ....................... 709/206 |
| 2004/0255039 A1* | 12/2004 | Honeisen ................... 709/230 |

* cited by examiner

*Primary Examiner*—Alpus Hsu
*Assistant Examiner*—Lina Yang
(74) *Attorney, Agent, or Firm*—Frank J. Bogacz

(57) ABSTRACT

For a network server (35) communicating with a wireless unit (10) via a Session Initiation Protocol, a retransmission method (50) first sets a timer based upon a time likely for a mobile unit to respond (54). Then the network server waits for a response (56). When the timer set for the kind of mobile unit being used expires (64), a retransmit of the original SIP request takes place (68). Optionally, modes for waiting may include a linear mode (72) and an exponential mode (74).

24 Claims, 2 Drawing Sheets

-PRIOR ART-

SESSION INITIATION PROTOCOL RETRANSMISSION METHOD

BACKGROUND OF THE INVENTION

The present invention pertains to packet data communication systems and more particularly to Session Initiation Protocol based retries of communication between a network and a user.

Session Initiation Protocol (SIP) over Internet protocol (IP) is commonly used in packet data networks to provide services including voice to wireless or mobile users. Session Initiation Protocol provides for certain methodology to retry an attempted communication between a server and a mobile unit (SIP invite request).

When using User Datagram Protocol (UDP) as a transport protocol, SIP employs retransmission request procedures to insure reliable transfers among networks and between the network and a user. Currently SIP provides for a retransmission time period which increases on an exponential basis. That is, the SIP protocol waits for approximately one-half second before retransmitting a message. For a retransmission and each successive retransmission, the SIP protocol doubles the time interval. For example, the original one-half second wait from the initial transmission would be doubled to one second before the second retransmission of a message. The retransmission time period would then be doubled successively until a response is received or a final response time out condition occurs.

When SIP is used over a wireless system, such as a CDMA (Code Division Multiple Access) system the response times typically become larger since the mobile user may be in an idle or dormant state and must be connected over an air interface (wireless). For such mobile users there is a very high probability that connection and response to the initial invite message or several of the retry messages will not occur within a time expected by the standard SIP response timers. As a result more retry transmissions will occur over the air interface.

Accordingly, it would be desirable to have a retransmission method which is customized for the applicable interface environment thereby lowering the traffic through the system and network.

PREFERRED EMBODIMENT OF THE INVENTION

Figure 1:
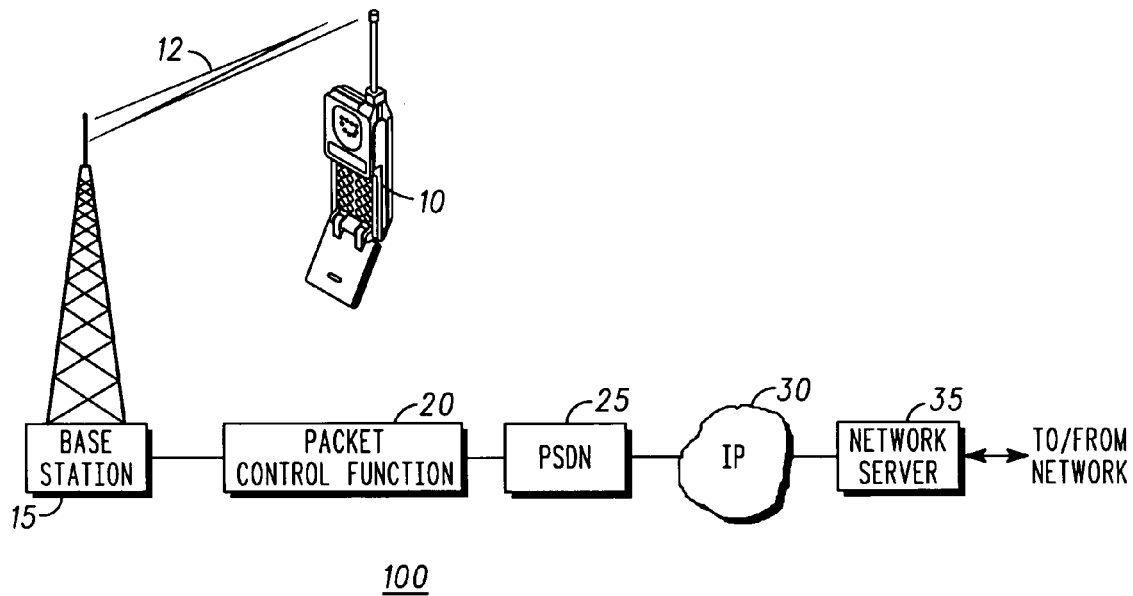
FIG. 1 is a block diagram of an internet protocol based packet data communication system in accordance with the present invention.

Referring to FIG. 1, a block diagram of a wireless packet data communication system is shown. This system is a Session Initiation Protocol (SIP) based communication system. The communication system shown in FIG. 1 embodies a CDMA (Code Division Multiple Access), however this invention is similarly applicable to GSM (Global System Mobile), GPRS (GSM Packet Radio Service), or iDEN communication systems. CDMA type communication systems include IS-95, UMTS (Universal Mobile Telephone Service) and other CDMA variations. Communication system 100 is shown including mobile unit 10 being coupled to network server 35 and to other networks not shown. Mobile unit 10 is coupled via a wireless link 12 to base station 15. In general the mobile unit 10 may be any client capable of being served by the communication system 100. Base station 15 in turn is coupled to packet control function (PCF) 20. Packet control function 20, among other things, may operate as a queuing point for internet protocol traffic to mobile unit 10. This queuing occurs when the Mobile Unit needs to be connected to the network.

Packet data switch node (PDSN) 25 forms a portion of the core internet protocol network. It is coupled to the PCF 20 and to the internet protocol network 30. This system extends IP to the Mobile Unit and supports the Session Initiation Protocol as defined in SIP standard RFC3261.

Internet protocol network 30 is coupled to a network server 35. Network server 35 is coupled to other networks and other servers as necessary. These other networks and servers are not shown.

For the network server 35 to initiate communications with mobile unit 10, a SIP invite request is sent through IP network 30, PDSN 25, PCF 20 to base station 15 where it is wirelessly transmitted to mobile unit 10 via wireless link 12. Establishing the wireless link 12 between base station 15 and mobile unit 20 may take some time. Typical times may range from three to four seconds for a mobile unit that is not active in a call.

Figure 2:
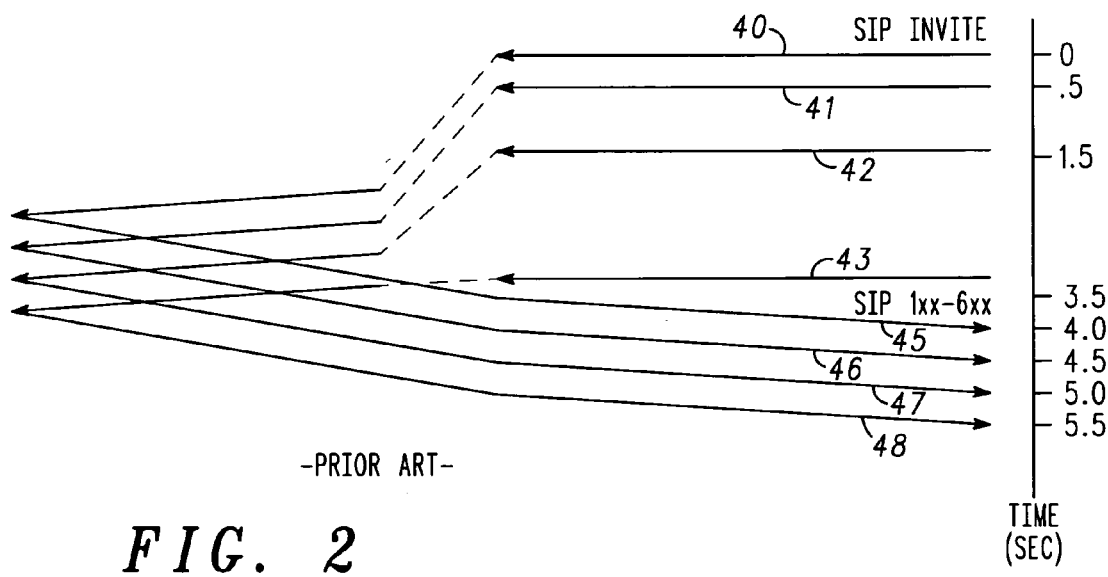
FIG. 2 is a flow diagram of a SIP invite request and subsequent retries in accordance with the prior art.

The transmission of the SIP invite from the network server 35 to mobile unit 10 is shown diagrammatically in FIG. 2. FIG. 2 demonstrates the prior art that is. FIG. 2 shows the flow of various SIP based messages between the network server 35 and mobile unit 10 based upon the standard IETF RFC3261. The message flow of the SIP invite request 40 is shown from right to left, that is from network server 35 to mobile unit 10. The timing of typical message transmission is shown downward in FIG. 2 from top to bottom as measured in seconds. At time zero, network server sends a SIP invite request 40 through IP network 30, through PDSN 25 to the packet control function 20. Packet control function 20 provides for queuing of traffic. Since it is known that this is a wireless system, sending a SIP invite to a mobile unit which is not currently on line will produce no value. As a result the PCF queues the SIP invite request until the Mobile Unit is connected.

Further, the PCF 20 indicates to base station 15 that it is wishing to communicate with mobile unit 10. Base station 15 then goes about establishing a communication link 12 with mobile unit 10. The elapsed time is shown as the downward portion of the SIP invite request in the dashed line portion. Before the SIP invite request may finally be transmitted by the PCF 20, a connection acknowledgment must be received. After connection of the mobile unit 10 to base station 15, the SIP invite message is received by mobile unit 10 at a time which may be three seconds or more from the original time zero when the network server 35 sent the SIP invite request. Mobile unit 10 then proceeds to respond as is required by the SIP protocol to the network server 35. Based upon various situations, it responds with a SIP 1XX–6XX type message 45. This message typically would be received by network server 35 approximately four seconds after the original SIP invite request was sent at time zero.

According to SIP standard RFC3261, the SIP protocol arrangement will attempt retries since the network server 35 has not received a response from the mobile unit 10. This standard SIP protocol typically calls for a retry approximately a half second after the original SIP invite. As a result network server 35 sends a retry of the SIP invite request 41 at time=0.5 seconds. This first retry SIP invite request 41 is again queued by PCF 20 since mobile unit 10 has not established the necessary connection and acknowledged to network server 35.

Next the standard SIP retransmission protocol requires waiting a time which is doubled from the previous retry before retrying again. Therefore, at time=1.5 seconds from the original SIP invite, a second retry Sip invite request 42 is made by network server 35. Again, it is transmitted through IP network 30, PDSN 25 and is queued by PCF 20 since mobile unit 10 is not yet on line and active.

Since according to SIP standard protocol an interval is doubled from the previous retry interval, at time=3.5 seconds, which is a two second delay or doubling the previous delay of one second, a third retry SIP invite request 43 is sent by network server 35 and is queued by PCF 20 similar to each of the previous SIP invite requests 40–42. As mobile unit 10 comes on line through base station 15, it begins responding to each of the SIP invites, the original SIP invite 40 and the retry SIP invites 41–43. The SIP 1XX–6XX response 45 was generated as a result of receiving Sip invite request 40. Similarly, SIP invite 1XX–6XX responses 46–48 correspond to retry SIP invites 41–43.

As can be seen from FIG. 2, the SIP replies, SIP 1XX–6XX messages 45–48, begin to be received by network server 35 between 4 and 5.5 seconds after the original SIP invite request was transmitted. It is to be noted that all times are approximate and are based upon minimal other network traffic and appropriate network traffic engineering. These times may be further delayed if substantial network traffic exists. As can be seen for the case of wireless packet data system 100 as shown in FIG. 1, the standard SIP protocol RFC3261 provides for a poor call processing performance. That is, SIP invite retries 41–43 and their responses 1XX–6XX 46–48 may not have been needed at all. These messages being sent back and forth through the network further load network traffic and prevent the network from operating in an optimal way. Further, this network loading may be multiplied many times for a number of mobile users.

Figure 3:
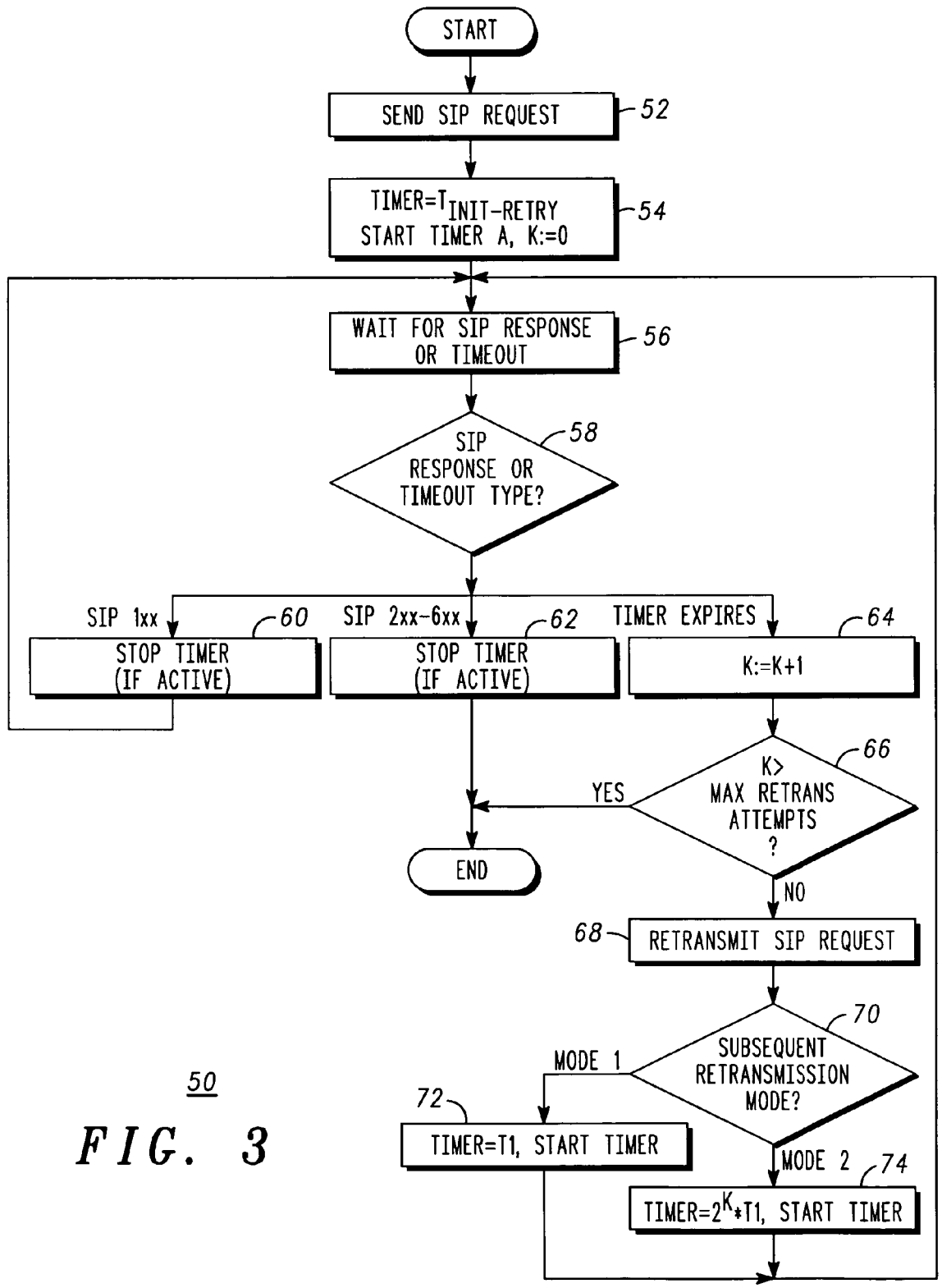
FIG. 3 is a flow chart of a SIP invite retransmission method in accordance with the present invention.

Referring to FIG. 3, a flow chart of an improved retransmission SIP invite request method 50 is shown. The method is initiated and block 52 is entered. Block 52 sends an initial SIP invite request to mobile unit 10 as was done by the prior art method. Next, block 54 sets timer A equal to a time of an initial retry. This time may be set based upon the type of system and may be system specific. For example, in a wireless system this time may be set for a time greater than 3.5 seconds which is typically the time for a mobile unit to be on line and start responding. Further, block 54 starts timer A and sets an indicator K equal to zero. K may be stored in software memory of the network server 35 or in a hardware latch, for example and represents the retransmission counter. That is, K indicates the number of retransmission attempts for an initial SIP invite that have been made.

Then, network server 35 begins waiting for a response from mobile unit 10 or a time out indicator of timer A, block 56.

If either a response or a time out is detected, block 58 is entered. Block 58 determines the type of response or time out that has occurred. If a SIP response of the type 1XX is received, block 58 transfers control to block 60 via the SIP 1XX path. This corresponds to a timely provisional response by mobile unit 10 and as a result block 60 stops timer A, which is the retry timer. Then, block 60 transfers control to block 56 to wait for another SIP response or time out.

If a SIP 2XX–6XX type message was received as the SIP response, block 58 transfers control to block 62 via the Sip 2XX–6XX path. A SIP 2XX–6XX message indicates a successful final response or an unrecoverable condition such as a fault or error. Block 62 stops the timer A, which is the retry timer. Next, block 62 ends the retry method since the final response has been received. The controlling system then processes the response in accordance with the application that sent the first SIP Invite at block 52. Typically this would include either sending other SIP messages or recovery from the error condition.

If timer A which is the retry timer expires, block 58 transfers control to block 64 via the timer A expire path. Block 64 increments the retransmission counter K by one. Next, block 66 determines whether the retransmission counter K is greater than a maximum number of retransmission attempts. If K is greater than the maximum number of retransmission attempts selected by the network operator, block 66 transfers control to end the process via the yes path. The controlling system then processes the response in accordance with the application that sent the first SIP Invite at block 52.

Since the timer A was initially set with an initial retransmission time, this initial retry or retransmission time allows the system operator to insure that SIP behaviors match expected responses from the target unit, such as a mobile unit. That is, an initial time before a retry may be set as to match the characteristics of the network. Therefore, timer A is a variable parameter which may be engineered by the system operator to correspond with real response times of the network. As a result, much retry or retransmission of the initial SIP invite messages is eliminated from the network. For example, retransmission SIP invite messages 41–43 will each be eliminated from being sent by network server 35 by this method. Further, the responses 46–48 will be eliminated from being transmitted through the network by the mobile unit 10 back to the network server 35. For typical behavior of method 50 without a fault only a SIP invite 40 and a SIP 1XX response 45 will be sent through the network. Retransmissions 41–43 and their corresponding replies 46–48 will not occur.

Next, if block 66 determines that the retransmission count is less than or equal to the maximum number of retransmissions, block 66 transfers control to block 68 via the no path. Since this is a non-fatal error and is a simple retry or retransmission due to a lost data packet or the like, retransmission of the SIP invite increases the probability of successful SIP session establishment. Block 68 retransmits the SIP request to the user.

Next, block 70 determines whether the retransmission mode is mode one or mode two. For mode one a typical value is set is timer A. This may be the same value as the standard SIP initial retry value (known as T1) or some slight variation. Block 70 transfers control to block 72 via the mode one path. Block 72 sets timer A equal to time T1 as mentioned above. Block 72 then transfers control to block 56 to begin the wait for response.

If the retransmission mode is mode two, block 70 transfers control to block 74 via the mode two path. Block 74 sets timer A equal to two raised to the $K^{th}$ power which is the retransmission counter times the basic time value T1. Effectively, this doubles the waiting time for each subsequent transmission. Block 74 then transfers control to block 56 to wait for a SIP response or time out.

Although FIG. 3 shows only linear or exponential retransmission timers, any other functions may be used to define the subsequent retransmission. This function can be approximated as an n dimensional polynomial of the form:

$$t1 = a0 + a1*K + a2*K^2 + a3*K^3 \ldots an*K^n$$

where a0, a1, a2, ... an are optimized coefficients. The linear case is where a0 is equal to T1 and all other coefficients are zero and the exponential case is the corresponding Taylor expansion of the exponential function.

Under certain conditions it may be advantageous to dynamically adjust the value of the initial retry or retransmission set by block 54 for timer A. Thus, the initial retry or retransmission time may be dynamically adjusted based upon a statistical analysis of measurement data taken by a system operator. Although four seconds was initially recommended above as an example, the time may be varied depending upon observed traffic flow or even dynamically adjusted to account for traffic peaks.

For example, communication systems typically collect statistics regarding average time between SIP invite requests and SIP trying responses. The system may set the initial retry or retransmission timer, timer A, to a value of approximately 90% of when responses are typically received.

As can be seen from the above description, the present SIP retransmission method enables optimal use of message retransmission and minimizes bandwidth utilization for retransmission messages. This results in optimization of call processing performance; efficient use of precious air interface resources; promotes convergence of internet and wireless products and services; and effectively extends Session Initiation Protocol services to wireless services.

The present invention determines that retrying the transmission of messages is premature. The system waits until there is a greater likelihood that a wireless target is able to receive and respond before sending a retry transmission. As a result, superfluous retry messages and their eventual response messages are inhibited by this system. Considerable end-to-end system processing is saved. Further, this system provides further call processing capability instead of using processing time for superfluous retry messages.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A message retransmission method for a server and a mobile unit in a Session Initiation Protocol (SIP) based communication system, the message retransmission method comprising the step of:
sending a SIP message by the server to the mobile unit;
setting by the server a timer based upon a mobile unit type, network type and a time likely for response by the mobile unit type; and
waiting by the server until the timer expires before sending a retransmission of the SIP message.

2. The message retransmission method as claimed in claim 1, wherein the communication system is a Code Division Multiple Access (CDMA) type of communication system.

3. The message retransmission method as claimed in claim 1, wherein the communication system is a Global System Mobile (GSM).

4. The message retransmission method as claimed in claim 1, wherein the communication system is an iDEN communication system.

5. The message retransmission method as claimed in claim 1, wherein the step of setting by the server a timer includes a step of starting the timer.

6. The message retransmission method as claimed in claim 1, wherein the step of setting by the server the timer includes a step of setting a retransmission counter to zero.

7. The message retransmission method as claimed in claim 6, wherein there is further included steps of:
determining by the server a response from the mobile unit; and
determining by the server a lack of a response by the mobile unit based on expiration of the timer.

8. The message retransmission method as claimed in claim 7, wherein if a SIP 1XX response was determined by the server, there is further included the steps of:
stopping the timer; and
repeating the step of waiting by the server.

9. The message retransmission method as claimed in claim 7, wherein if the response determined by the server is a SIP 2XX–6XX message, there is further included the steps of:
stopping the timer; and
ending the message retransmission method.

10. The message retransmission method as claimed in claim 7, wherein if the timer expires, there is further included a step of incrementing the retransmission counter by one.

11. The message retransmission method as claimed in claim 10, wherein:
if the retransmission counter is greater than a maximum retransmission attempts, there is further included a step of ending the message retransmission method; and
if the retransmission counter is less than or equal to the maximum retransmission attempts, there is further included a step of retransmitting the SIP message by the server.

12. The message retransmission method as claimed in claim 11, wherein there is further included a step of determining a retransmission mode.

13. The message retransmission method as claimed in claim 12, wherein if the retransmission mode is a first mode, there is further included a step of maintaining a constant value of the timer.

14. The message retransmission method as claimed in claim 12, wherein if the retransmission mode is a second mode, there is further included a step of increasing a value of the timer exponentially.

15. A message retransmission method between a client and a server using Session Initiation Protocol (SIP), the message retransmission method comprising the steps of:
sending a SIP message between the server and the client;
setting a timer based upon a client type, network characteristics and a first time likely for a response by the client type; and
waiting until the timer expires before sending a retransmission of the SIP message.

16. The message retransmission method as claimed in claim 15, wherein there is further included steps of:
utilizing Code Division Multiple Access (CDMA) between the server and the client; and
setting an initial value of the timer equal to approximately four seconds.

17. The message retransmission method as claimed in claim 15, wherein there is further included steps of:
utilizing a Global System Mobile (GSM) protocol between the client and the server; and setting an initial value of the timer equal to approximately four seconds.

18. The message retransmission method as claimed in claim 15, wherein there is further included steps of:
    utilizing an iDEN interface between the client and the server; and
    setting an initial value of the timer equal to approximately one second.

19. The message retransmission method as claimed in claim 15, wherein there is further included a step of waiting until expiration of the timer before sending a retransmission of the SIP message between the server and the client.

20. The message retransmission method as claimed in claim 15, wherein there is further included a step of limiting a number of retransmissions of the SIP message between the client and the server to a predetermined number.

21. The message retransmission method as claimed in claim 15, wherein there is further included a step of maintaining a constant value of the timer for subsequent retransmissions of the SIP message.

22. The message retransmission method as claimed in claim 15, wherein there is further included a step of exponentially increasing a value of the timer for subsequent retransmissions of the SIP message.

23. The message retransmission method as claimed in claim 15, wherein there is further included a step of adjusting a value of the timer for an initial setting.

24. The message retransmission method as claimed in claim 15, wherein there is further included a step of adjusting a value of the timer for a a subsequent retransmission.

* * * * *